United States Patent [19]
Finckh et al.

[11] 3,895,887
[45] July 22, 1975

[54] GAS TURBINE FOR USE IN A CLOSED CYCLE PLANT

[75] Inventors: Hermann Finckh, Boxdorf; Martin Trabler, Grossdechsendorf, both of Germany

[73] Assignee: Westinghouse Electric Corporation, Pittsburgh, Pa.

[22] Filed: June 12, 1973

[21] Appl. No.: 369,331

[30] Foreign Application Priority Data
June 16, 1972 Germany............................ 2229510

[52] U.S. Cl. ............................................. 417/408
[51] Int. Cl. ............................................ F04b 17/00
[58] Field of Search .................................... 417/408

[56] References Cited
UNITED STATES PATENTS

| | | | |
|---|---|---|---|
| 3,202,341 | 8/1965 | Lafleur | 417/408 |
| 3,210,254 | 10/1965 | Fortescue | 417/408 |
| 3,221,982 | 12/1965 | Yampolsky | 417/408 |

FOREIGN PATENTS OR APPLICATIONS

| | | | |
|---|---|---|---|
| 655,698 | 1/1938 | Germany | 417/408 |

*Primary Examiner*—C. J. Husar
*Attorney, Agent, or Firm*—G. H. Telfer

[57] ABSTRACT

A gas turbine for use in a closed cycle with a nuclear reactor that uses helium as a coolant and as the working fluid in the turbine. The inlet and outlet conduits in the compressor-turbine arrangement are disposed around the outside surface of the rigid housing, thereby reducing the overall dimension of that housing.

3 Claims, 2 Drawing Figures

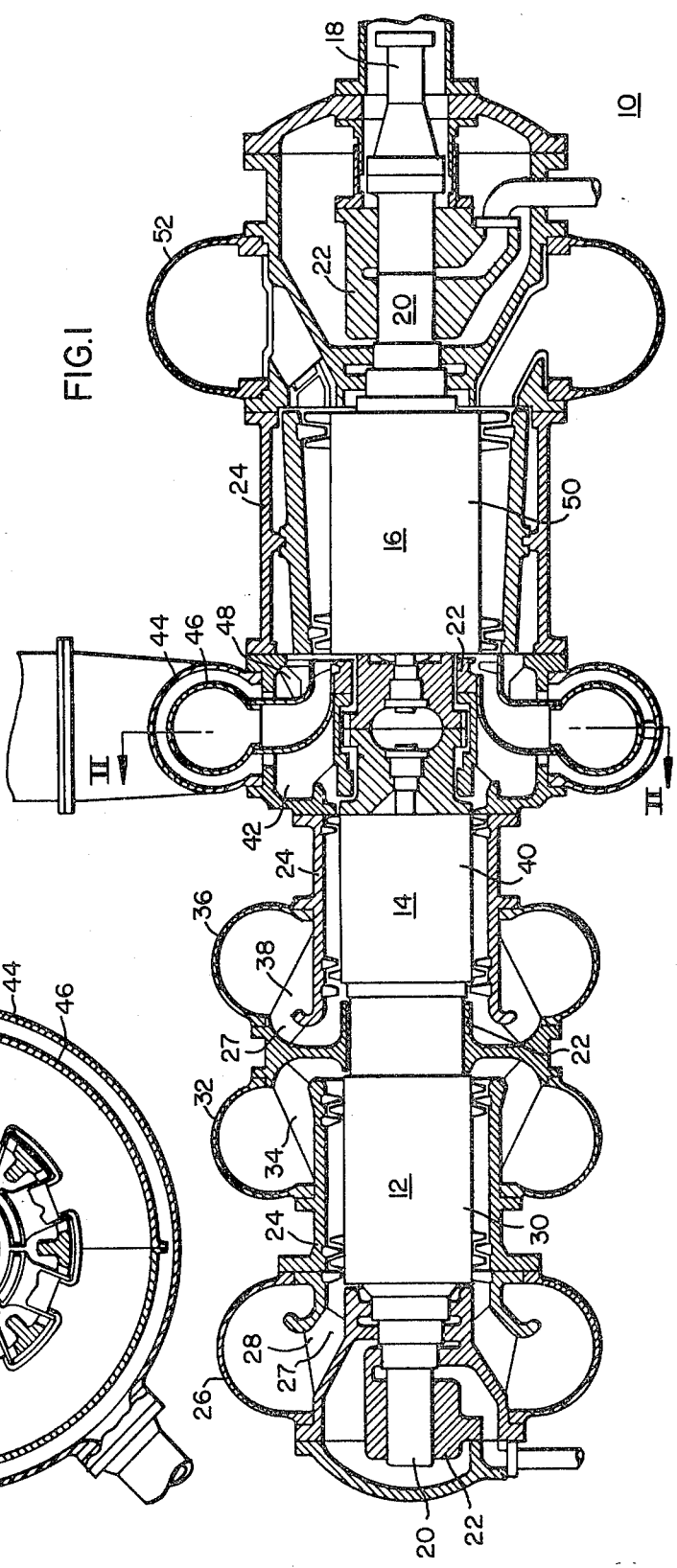

GAS TURBINE FOR USE IN A CLOSED CYCLE PLANT

BACKGROUND OF THE INVENTION

1. Field of the Invention

This invention relates generally to gas turbines, and more particularly to the housing and motive fluid passageways for a closed cycle gas turbine.

2. Description of the Prior Art

Gas turbines are employed in open and closed cycles. Gas turbines are beginning to be used in the closed cycle in conjunction with nuclear reactors. They are replacing steam turbines that have been used in the cycle with the nuclear reactor. The steam turbines that have been used in these cycles have required large size machines and apparatus. Regulating valves in hot parts of the machines are necessary. High pressure is common throughout the system requiring heavy containment equipment. Large dimensions of the vessels are also required in order to develop the necessary power from the equipment. One of the objects of the present invention is to provide a turbine that will operate in a closed cycle, as with a nuclear reactor, yet not have the size and weight that the turbines require of the prior art.

A gas turbine for use in a closed cycle, with helium as the cooling medium for a reactor and also as the working fluid for the gas turbine has been described in the Journal "Energie und Technik" 20th year, part 1, pages 1–10, and also in Sawyer's Gas Turbine Engineering Handbook, second edition, Volume II, pages 274–282.

BRIEF SUMMARY OF THE INVENTION

The present invention provides reduced structural diminsions and weight for closed cycle gas turbines.

Annular conduits are disposed on the outside of the rigid housings enclosing the compressors and turbine. The conduits provide ingress and egress for motive fluid working in the equipment. The system is a closed cycle using helium as a working fluid, which allows relatively low pressures to power the turbine. The generally low pressures and the annular conduit design also remove the requirement for thick wall passageways.

BRIEF DESCRIPTIONS OF THE DRAWINGS

The invention, along with objects and advantages thereof will be best understood from the following detailed description taken in connection with the accompanying drawings in which:

FIG. 1 is a sectional view of a closed cycle gas turbine, and

FIG. 2 is a view taken generally along the lines II—II of FIG. 1.

DESCRIPTION OF THE PREFERRED EMBODIMENT

Referring to the drawings in detail, particularly to FIG. 1, there is shown a sectional view of a closed cycle gas turbine 10. The gas turbine 10 includes a first compressor 12, a second compressor 14, and a turbine 16, which turns a generator, not shown, through a suitable coupling arrangement 18.

Both compressors, 12 and 14, are shown mounted on a common axis 20 which also extends through the turbine member 16. The axis is supported by a plurality of bearings, 22, only four of which are shown.

A rigid generally cylindrical housing 24 is disposed about the compressors, 12 and 14, and the turbine 16. The housing 24 is generally coaxial with the axis 20.

The first compressor 12 has an annularly shaped gas inlet conduit 26 disposed just radially outwardly of the rigid housing 24, having gas passageways 27 through a plurality of axially aligned ribs 28. The annular conduit 26 uniformly feeds the gas into the compressor 12 through the passageways 27. The ribs 28 provide a directional orientation to the gas, and they also maintain rigidity of the housing 24. The gas passes through a bladed section 30, and then exits out another annularly shaped conduit 32 disposed outwardly of the rigid housing 24. Another array of ribs 34 is disposed about the outlet of the compressor 12, similar to the inlet ribs 28.

The second compressor 14 has an annularly shaped gas inlet conduit 36 disposed outwardly of its housing 24. The conduit 36 is also arranged outwardly of another array of ribs 38 disposed across the inlet area of the second compressor 14. The gas, after entering through the passageways 27 and being directionally aligned by the ribs 38, passes through a bladed section 40 before exiting beyond ribs 42 and out an annular conduit 44.

The annular outlet conduit 44 of the second compressor 14 is coaxially disposed about an inner annularly shaped inlet conduit 46 serving as the gas inlet passageway for the turbine 16. The coaxial arrangement of the output conduit 44 of the second compressor 14 and the inlet conduit 46, is also shown in FIG. 2.

The annular turbine inlet conduit 46 is not made pressure resistant because the pressure inside the walls of the conduit 46 is almost the same as the pressure existing at the outside of the walls of the conduit 46.

The annular inlet conduit 46 is attached to the inlet side of the turbine 16 by an array of bracing members 48 located around the periphery of the inlet section on the turbine 16.

On the turbine 16 side of the arrangement, a hot gas from a nuclear reactor passes through a bladed section 50 of the turbine 16, it expands, and exits out an annularly shaped exit conduit 52. The exit conduit 52 is disposed on the outer side of the housing 24 at the outlet portion of the turbine 16.

The annular conduits 26, 32, 36, 44, and 52, are all open toward the housing 24, and are attached to various circular faces of the latter. By this means, the cross sections in the vicinity of the annular conduits 26, 32, 36, 44 and 52 are torus-shaped. The cross section of the conduits 26, 32, 36, 44 and 52 being such that they will withstand generally high internal pressure. The housing 24 is designed to withstand high stresses in bending and tension. The housing 24 must also be able to withstand the gas pressure when no annular conduits are provided. By contrast with the above mentioned conventional turbines, the cross sections of the housings 24 are only a little larger than the blading in the turbine 10.

It should be understood that the foregoing disclosure relates only to a preferred embodiment of the present invention and that other modifications or alterations may be made therein without departing from the spirit and scope of the invention as set forth in the appended claims.

We claim:

1. A gas motive fluid utilizing machine arrangement including:
- at least one turbomachine member,
- said turbomachine member having an axis,
- said turbomachine member being enclosed by a generally coaxial rigid housing,
- said turbomachine member having at least one generally annularly shaped conduit disposed generally outside of and adjacent said rigid housing,
- said generally annularly shaped conduit being disposed around at least one end of said turbomachine, said conduit providing ingress or egress for said motive fluid,
- a plurality of orifices in registration between said conduit and said rigid housing, said orifices being generally deformed by a plurality of axially aligned ribs disposed generally radially inwardly of said conduit, said ribs providing directional guidance for said motive fluid, said ribs also being in a supportive relationship between said housing and said axis for the maintenance of rigidity in said housing, said orifices providing means for passage of gaseous fluid therethrough.

2. A gas motive fluid utilizing machine arrangement as recited in claim 1, wherein a generally annular conduit is provided for ingress of said motive fluid from said turbomachine, and another generally annular conduit is provided for egress of said motive fluid from said turbomachine.

3. A gas motive fluid utilizing machine arrangement as recited in claim 1, including:
- an annular conduit for ingress of motive fluid into said turbine member being generally coaxial with an annular conduit for egress of motive fluid from said compressor member, both of said annular conduits being disposed outwardly of said rigid housing.

* * * * *